2,907,605

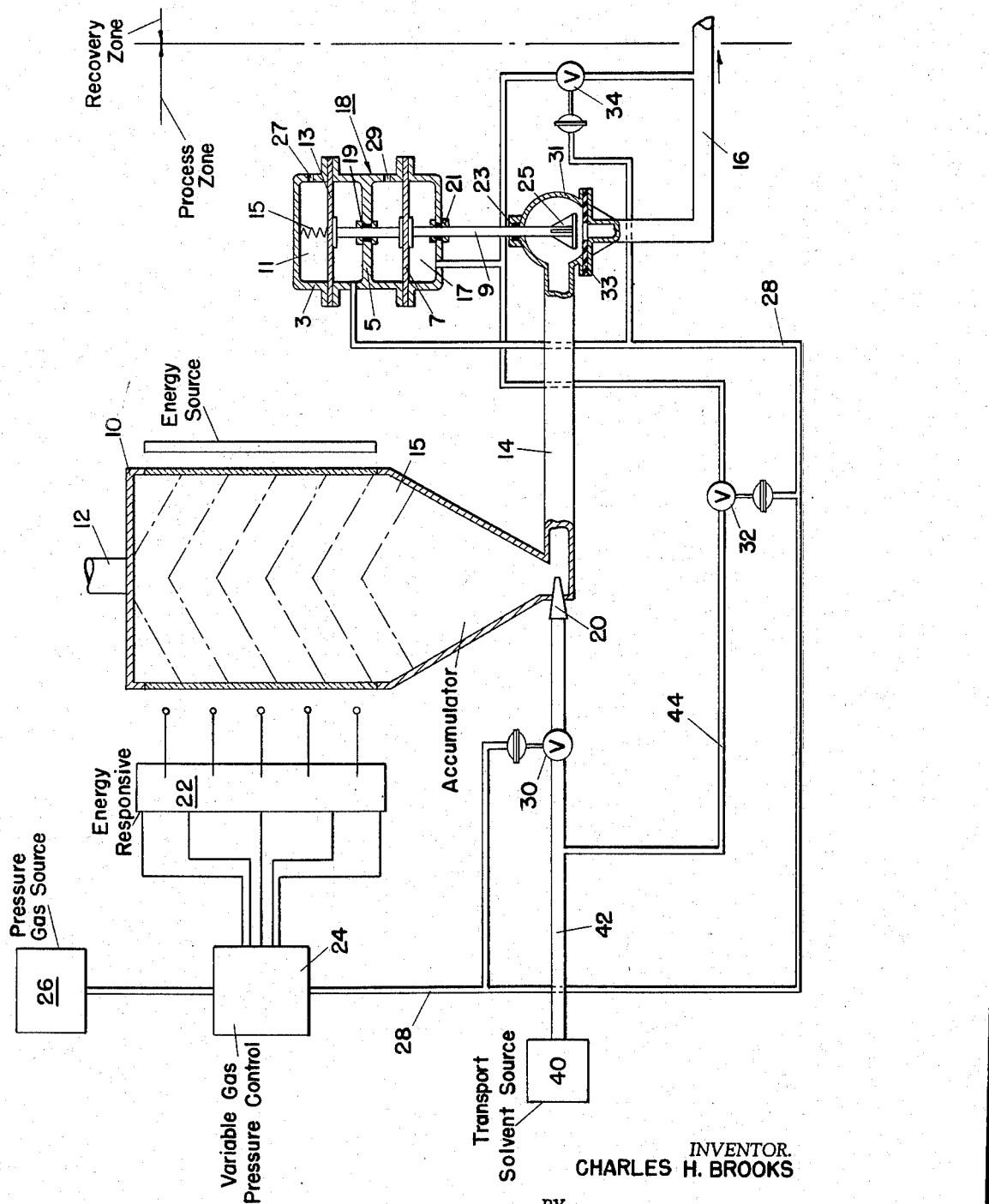

APPARATUS FOR TRANSFER OF SOLIDS BETWEEN ZONES OF DIFFERENT PRESSURES

Charles H. Brooks, Swarthmore, Pa., assignor to Sun Oil Company, Philadelphia, Pa., a corporation of New Jersey Application October 29, 1957, Serial No. 693,159

5 Claims. (Cl. 302—17)

This invention relates to automatic control systems and particularly to systems controlling the movement of liquid-supported solids between zones of relatively different pressures.

In one of its more specific aspects this invention is designed to provide an improved apparatus for the continuous removal of polymer-coated catalyst from a reaction or process zone to a recovery zone. Such a removal process and the initial apparatus for the reaction is described and claimed in my United States application, Serial Number 678,410, filed August 15, 1957. This application is concerned only with the apparatus for transfer of the coated catalyst developed in this and like processes, between zones of different pressures.

The broad object of this invention is to provide an efficient apparatus for the above purpose responsive to accumulated volumes of the solids which are periodically removed in a manner preserving the pressure conditions in the connected zones.

A further object is to provide a system of elements coordinated in operation to discharge the accumulated solids under pressure conditions which preserve the operating pressure balance between zones.

Yet another object is to provide a system for moving solids between zones by means of a jet stream of liquid operated in conjunction with valve means separating said zones.

Broadly the invention comprises an accumulator positioned to receive the solids as they are removed from active participation in the attended process. The interior of the accumulator is necessarily at the process operating (higher) pressure. A valve controlled outlet from the accumulator separating the zones mentioned restrains the solids' movement therebetween. Directing a controlled flow of pressured liquid of a composition selected with regard to the chemical demands of the associated process, a jet means is positioned to assist the movement of the stream of solids through the valve controlled accumulator outlet. Control means responsive to the depth of the accumulated volume of solids, coordinates the flow of liquid through the jet means with the operation of the valve to pass the solids in bulk to the adjacent recovery or lower pressure zone.

The invention thus broadly described, is specifically detailed in the following description wherein the novel characteristics are set forth and subsequently included in the appended claims. This description, together with the above-mentioned objects and others evident therefrom, will best be understood when read in connection with the accompanying drawings, in which the single figure is a diagrammatic sketch showing the essential elements of a system connected in accordance with the invention.

In the drawing, an accumulator 10, having an inlet 12 and an outlet 14, is positioned to receive and hold varying volumes of solids 15 as desired. A conduit 16 controlled by valve 18, extends from the accumulator outlet 14 through the valve from the first or process zone into the second or recovery zone. Jet means 20, positioned to cooperate with the accumulator outlet and conduit 16, is directed to deliver pressured liquid for propelling the solids 15 through valve 18. The liquid, selected in relation to the chemical requirements of the process, as indicated above, being used at relatively high pressure and velocity moves the solids in bulk through the valve, thus maintaining the pressure differences between the zones.

It will be evident to those versed in the art that coordination of the jet and valve operation is necessary to successful operation of the system. In the described mechanism, varying volumes of solids as received and held in the accumulator periodically actuate these two elements in synchronism. A volume sensing means 22, here indicated as a well-known light-beam-photo-electric-cell combination, is illustrated. That this is symbolic for any acceptable control element will be readily understood. Any particular type of control device adopted which operates a switch mechanism in response to variations in the volume of solids deposited is acceptable. United States Patent Number 2,147,422, dated February 14, 1939, discloses a light-beam-controlled mechanism, usable as a control. United States Patent Number 2,696,606, dated December 7, 1954, is a form of device, usable in non-transparent chambers, which would also serve the purpose of this disclosure. Such control element will be claimed only as part of the system and not per se.

A switching (variable gas pressure control) mechanism 24, symbolically indicated, is arranged to respond to the function of volume control 22, thus forming part of the control means. By the operation of switching mechanism 24 air from a source 26 is admitted to conduit 28, in varying pressures depending on the depth of solids in accumulator 10, and is conducted to liquid control valve 30 and to valve 18, previously mentioned. Valve 30 is a single compartment diaphragm operated valve.

A source of liquid under pressure illustrated here as the transport solvent source 40, is connected to jet 20 through air operated valve 30 by conduit 42. Branch conduit 44, tapped into conduit 42 between the source 40 and valve 30 and therefore not subject to the operation of that valve, conducts the pressured liquid to the lower one 17 of the two diaphragm chambers in valve 18. Valve 32, air operated as shown, controls the flow of liquid through conduit 44 to valve 18. Conduit 44 continues beyond valve 18 to pass through valve 34, synchronized to operate in reverse to valve 32 (as will be understood on reading the description of operation), and empties into conduit 16 as it links with the recovery zone elements. Valve 34 is also air operated, but, as stated, reversely to valve 32.

The drawing also includes a detail elevational view in section, showing the constructional features of valve 18. As disclosed above, valve 18 separates the process and recovery zones. It is designed to prevent the transfer of pressure between these zones, respond accurately to the pressures operating it as required by the varying depth of solids in the accumulator 10, and pass these solids to conduit 16 before firmly seating in pressure-sealed closed position.

These operating requirements are met by providing a pressure chamber 3 in which there is an upper compartment 11, wherein are enclosed diaphragm 13 and a resilient member such as spring 15. Lower compartment 17, separated from upper compartment 11 by horizontal partition 5, encloses diaphragm 7. Both diaphragms are fixed to an operating rod 9 which extends longitudinally of the valve through the necessary stuffing boxes 19, 21, and 23, into operating engagement with disc 25. Vents 27 and 29, opening from the spaces of compartments 11 and 17, respectively, on the side of the diaphragms away from the operating pressure, are provided to make certain that there will be no additional restraint on the operation of those diaphragms other than the weight of the elements and the opposition of the resilient element, shown as spring 15.

Disc 25, enclosed in the body 31 of the valve, moves into and away from a flat seat 33 the center of which is apertured for the passage of solids to conduit 16. Both disc 25 and the opposed flat seat 33 are covered with a soft, resilient material inert to chemical action of the solids and liquids being handled, such as neoprene, urethane foam, silicon rubber and the like, subject to being deformed temporarily when embedding solid particles, yet being able to close on these embedded particles in sealing contact. This requires the facing material to be of a thickness from two to five times that of the diameter of the particles on which it will close. As the disc is flat, all the pressure in the apparatus in the process zone will insure the valve faces being held in sealing relation, which further requires sufficient depth of the facing material to absorb the captured particles. This feature of the valve will be discussed again in describing the operation of the device.

Reference to the drawing in relation to the following description of the cooperation of the illustrated elements of the system will facilitate an understanding of its operation. Accumulator 10 receives varying quantities of solids from preceding steps in a process, as for example as described in the copending application noted above. Due to irregularities in production or variations in the attended processes the solids may assume great or little depth therein, or they may assume any intermediate depth. By means of the energy responsive volume sensing means 22 cooperating with the accumlator, controlled pressures of air are transmitted from source 26 into conduit 28 through the switching mechanism 24. If the depth is great the corresponding pressure released to conduit 28 is great, in order to move the accumulated solids' volume. If there is a comparatively small depth, air of limited pressure only is released to conduit 28.

In addition to the regulated air pressure described, liquid pressure is also used to operate valve 18. Before this liquid pressure becomes available to valve 18, however, it is necessary that the liquid control valves 30, 32, and 34 receive the actuating air pressure and perform their respective functions. Valve 30 responds first, permitting liquid pressure to pass through conduit 42 from source 40 into jet 20 to act with force against the solids accumulated in conduit 14. As this force of liquid is applied to conduit 14, valve 32 opens, passing the liquid under pressure into the lower compartment 17 of valve 18, thereby exerting upward force on diaphragm 7. The force of the liquid is controlled at that pressure sufficient to counterbalance the weight of the valve's moving parts and the compression of spring 15. Pressured gas such as air, for example, is in the lower part of upper compartment 11, exerting graduated upward pressure on diaphragm 13. Together, the two pressured fluids cooperate in opening valve 18 to an extent commensurate with the depth of solid particles in accumulator 10. If a large volume is present, full air pressure opens valve 18 wide. Gradations of this extended opening are produced in response to the various (lower) air pressures received in the upper chamber of valve 18.

Valve 34, working in opposition to valve 32, closes firmly as valve 32 opens. The liquid under pressure is thus held in the lower compartment 17 of valve 18. The valve 18, held in open position, passes the jet-moved solids through the valve seat into conduit 16. As the volume of solids subsides in the accumulator, the air force necessary to operate the several valves is diminished and finally shut off. The air control 24, as released, bleeds the pressure from the air lines. Valves 32 and 18 close. Valve 34 opens, bleeding the liquid pressure from the lower chamber of valve 18, permitting the valve faces to seat firmly together. As explained above, the soft contacting faces between the disc and seat absorb any solid particles not washed through the valve.

I claim:

1. A system for transferring solids between zones of different pressures comprising an accumulator having inlet and outlet ends to receive the solids in an initial pressure zone; a conduit connecting the outlet end with a zone of lower pressure, an air-liquid-operated valve in said conduit normally separating the zones of different pressures, a jet opening into the conduit adjacent the accumulator outlet, pipe means transmitting pressured liquid to said jet and the air-liquid-operated valve, an air-operated valve in said pipe means controlling the pressured liquid flow to the jet, and control means for the operating air to said valves responsive to the level of the solids in said accumulator and coordinating the flow of pressured liquid with the movement of the first air-liquid-operated valve and with the movement of solids by pressured liquid through said first-mentioned valve.

2. A system for transferring solids from a zone of high pressure to a zone of relatively low pressure comprising an accumulator adapted to receive solids in a high pressure zone, an outlet from the accumulator, a two-compartment diaphragm-operated valve adapted for both air and liquid operation positioned in the outlet separating the zones of relatively high and low pressure, jet means positioned to supply liquid to the accumulator outlet to flow the solids through said valve, a single-compartment diaphragm air-operated valve positioned to control the flow of liquid through said jet means, a source of air under pressure operably connected to the air compartments of both valves, control means cooperating with the air source for controlling the flow of pressured air to said valves in response to the height of solids in the accumulator, and a conduit from the jet means to the liquid-receiving compartment of the two-compartment diaphragm-operated valve delivering additional operating force synchronized with the movement of the solids through the outlet.

3. A system for transferring solids from a zone of high pressure to a zone of relatively low pressure comprising an accumulator adapted to receive solids in a high pressure zone, an outlet from the accumulator, a two-compartment diaphragm-operated valve in the outlet separating the zones of relative high and low pressure, jet means positioned to supply liquid to the accumulator outlet to flow the solids through said valve, a single-compartment diaphragm-operated valve positioned to control the flow of liquid through said jet means, a source of air under pressure operably connected to both valves, control means cooperating with the air source for controlling the flow of pressured air to said valves in response to the height of solids in the accumulator, and a conduit from the jet means to one compartment of the two-compartment diaphragm-operated valve delivering additional operating force synchronized with the movement of the solids through the outlet.

4. A system for transferring solids between zones of relatively different pressures comprising an accumulator having an inlet and an outlet for the passage of solids therethrough; a pressure-responsive valve cooperating with the outlet and responsive to both air and liquid pressure, jet means opening into the outlet of the accumulator and directed to flow the moving solids through said valve, an air-operated valve controlling the passage of pressured liquid to the jet means, control means for supplying air to both of said valves, operating means for said control means responsive to the height of solids in the accumulator, and conduit means connecting the pressure-responsive valve to the pressured liquid flow delivered to the jet means.

5. A system for transferring solids between zones of relatively different pressures comprising means to accumulate the solids in one of said zones, a valve separating the zones and controlling the flow of solids therethrough, said valve being adapted to respond to both air and liquid pressures, jet means positioned to deliver liquid to the solids and move them through said valve, air and liquid flow control means cooperating with said jet means and said valve, and means responsive to the depth of accumulated solids to synchronously operate said air and liquid flow control means.

References Cited in the file of this patent

UNITED STATES PATENTS

| | | |
|---|---|---|
| 2,271,148 | Becker | Jan. 27, 1942 |
| 2,602,467 | Griswold | July 8, 1952 |
| 2,614,583 | Di Maggio | Oct. 21, 1952 |
| 2,636,642 | Gorin | Apr. 28, 1953 |
| 2,638,385 | Vogel-Jorgensen | May 12, 1953 |
| 2,668,365 | Hogin | Feb. 9, 1954 |
| 2,684,870 | Berg | July 27, 1954 |

FOREIGN PATENTS

| | | |
|---|---|---|
| 1,058,639 | France | Nov. 4, 1953 |